US012293596B1

(12) United States Patent
Goldman Kalaydin et al.

(10) Patent No.: US 12,293,596 B1
(45) Date of Patent: May 6, 2025

(54) DETECTING SYNTHETIC VISUAL MEDIA

(71) Applicant: Raritex Trade Limited, Lefkosia (CY)

(72) Inventors: Pavel Goldman Kalaydin, Berlin (DE); Aleksey Samarin, Belgrade (RS); Alexander Saveliev, Belgrade (RS)

(73) Assignee: Raritex Trade Limited, Lefkosia (CY)

( * ) Notice: Subject to any disclaimer, the term of this patent is extended or adjusted under 35 U.S.C. 154(b) by 0 days.

(21) Appl. No.: 18/775,064

(22) Filed: Jul. 17, 2024

(51) Int. Cl.
*G06V 20/00* (2022.01)
*G06V 10/42* (2022.01)
*G06V 10/764* (2022.01)
*G06V 10/771* (2022.01)
*G06V 10/774* (2022.01)
*G06V 10/80* (2022.01)
*G06V 10/82* (2022.01)

(52) U.S. Cl.
CPC ............ *G06V 20/95* (2022.01); *G06V 10/431* (2022.01); *G06V 10/764* (2022.01); *G06V 10/771* (2022.01); *G06V 10/774* (2022.01); *G06V 10/80* (2022.01); *G06V 10/82* (2022.01)

(58) Field of Classification Search
CPC .... G06V 20/95; G06V 10/431; G06V 10/764; G06V 10/771; G06V 10/774; G06V 10/80; G06V 10/82
See application file for complete search history.

(56) References Cited

U.S. PATENT DOCUMENTS

| | | | |
|---|---|---|---|
| 2021/0319240 A1 | 10/2021 | Demir et al. | |
| 2021/0365714 A1* | 11/2021 | Goswami | G06V 10/764 |
| 2022/0004904 A1 | 1/2022 | Stemmer et al. | |
| 2022/0121868 A1 | 4/2022 | Chen et al. | |
| 2023/0281461 A1 | 9/2023 | Woo et al. | |
| 2023/0385385 A1 | 11/2023 | Ur | |
| 2024/0078845 A1 | 3/2024 | Woo et al. | |
| 2024/0265663 A1* | 8/2024 | Duan | G06V 10/25 |
| 2024/0282288 A1* | 8/2024 | Berkhoff | G10K 11/17881 |

FOREIGN PATENT DOCUMENTS

| | | |
|---|---|---|
| CN | 112580520 | 3/2021 |
| CN | 113283393 | 8/2021 |
| CN | 114612847 | 6/2022 |
| CN | 115100722 | 9/2022 |

(Continued)

OTHER PUBLICATIONS

Bhalerao "A Deep Dive Into Non-Maximum Suppression (NMS)", BuiltIn, 7 P., Nov. 2, 2023.

(Continued)

*Primary Examiner* — Bobbak Safaipour

(57) ABSTRACT

Method and system for detecting synthetic visual media comprising the steps of receiving visual media, wherein the visual media is synthetic visual media or genuine visual media. Identifying at least one feature within the visual media. Identifying a first portion of the visual media and second portion of the visual media, the first portion of the visual media containing the at least one feature and the second portion of the visual media not including the at least one feature. Providing the first portion and the second portion to a trained machine learning (ML) model. The trained ML model providing data indicating the visual media to be synthetic and/or genuine.

19 Claims, 5 Drawing Sheets

(56) References Cited

FOREIGN PATENT DOCUMENTS

| CN | 115393760 | 11/2022 |
| CN | 115512423 | 12/2022 |
| EP | 4050571 | 8/2022 |
| KR | 10-2523372 | 4/2023 |
| KR | 10-2023-0070660 | 5/2023 |

OTHER PUBLICATIONS

Blümer et al. "Detection of Deepfakes Using Background-Matching", Symposium on Electronic Imaging, Digital Library, 35(Art.ID): MWSF-381-1-MWSF-381-6, Published Online Jan. 2023.

Brock et al. "Large Scale GAN Training for High Fidelity Natural Image Synthesis", ARXiv Preprint ArXiv:1809.11096v1, p. 1-29, Sep. 28, 2018.

Chi et al. "Fast Fourier Convolution", 34th Conference on Neural Information Processing Systems, NeurIPS 2020, Vancouver, Canada, Dec. 6-12, 2020, 10 P., Dec. 6, 2020.

Corvi et al. "On the Detection of Synthetic Images Generated by Diffusion Models", 2023 IEEE International Conference on Acoustics, Speech and Signal Processing, ICASSP 2023, Rhodes Island, Greece, Jun. 4-10, 2023, p. 1-5, Jun. 4, 2023, ArXiv Preprint ArXiv: 2211.00680v1, p. 1-6, Nov. 1, 2022.

Cui et al. "Democratizing Contrastive Language-Image Pre-Training: A CLIP Benchmark of Data, Model, and Supervision", ArXiv Preprint ArXiv:2203.05796v1, p. 1-7, Mar. 11, 2022.

Deng et al. "ImageNet: A Large-Scale Hierarchical Image Database", Proceedings of the 2009 IEEE Computer Society Conference on Computer Vision and Pattern Recognition, CVPR 2009, Miami, FL, USA, Jun. 20-25, 2009, p. 248-255, Jun. 20, 2009.

Frank et al. "Leveraging Frequency Analysis for Deep Fake Image Recognition", International Conference on Machine Learning, p. 3247-3258, Nov. 21, 2020.

Girish et al. "Towards Discovery and Attribution of Open-World GAN Generated Images", Proceedings of the IEEE/CVF International Conference on Computer Vision, ICCV, Montreal, QC, Canada, Oct. 10-17, 2021, p. 14094-14103, Oct. 10, 2021.

Goodfellow et al. "Generative Adversarial Networks", Communications of the ACM, 63(11): 139-144, Nov. 2020.

He et al. "Deep Residual Learning for Image Recognition", 2016 IEEE Conference on Computer Vision and Pattern Recognition, CVPR, Las Vegas, NV, USA, Jun. 27-30, 2016, p. 770-778, Jun. 27, 2016.

Kirillov et al. "Segment Anything", ArXiv Preprint ArXiv:2304. 02643v1, p. 1-30, Apr. 5, 2023.

Li et al. "Blip-2: Bootstrapping Language-Image Pretraining With Frozen Image Encoders and Large Language Models", ArXiv Preprint ArXiv:2301.12597v1, p. 1-13, Jan. 30, 2023.

Lin et al. "Microsoft COCO: Common Objects in Context", Proceedings of the 2014 13th European Conferenceon Computer Vision, ECCV 2014, Zurich, Switzerland, Sep. 6-12, 2014, Lecture Notes in Computer Science, Part V(8693): 740-755, Sep. 6, 2014.

Liu et al. "Grounding Dino: Marrying Dino With Grounded Pre-Training for Open-Set Object Detection", ArXiv Preprint ArXiv:2303. 05499v1, p. 1-15, Mar. 9, 2023.

Loshchilov et al. "SGDR: Stochastic Gradient Descent With Warm Restarts", ArXiv Preprint ArXiv: 1608.03983v1, p. 1-9, Aug. 13, 2016.

Loshchilov et al. "Decoupled Weight Decay Regularization", ArXiv Preprint ArXiv:1711.05101v1, p. 1-13, Nov. 14, 2017.

Ramesh et al. "Zero-Shot Text-to-Image Generation", Proceedings of the 38th International Conference on Machine Learning, 139: 8821-8831, Jul. 1, 2021.

Rao et al. "Global Filter Networks for Image Classification", Advances in Neural Information Processing Systems, NeurIPS, 34: 980-993, Dec. 6, 2021.

Ricker et al. "Towards the Detection of Diffusion Model Deepfakes", ArXiv Preprint ArXiv:2210.14571v1, p. 1-24, Oct. 26, 2022.

Rombach et al. "High-Resolution Image Synthesis With Latent Diffusion Models", Proceedings of the IEEE/CVF Conference on Computer Vision and Pattern Recognition, p. 10684-10695, 2022.

Sha et al. "DE-FAKE: Detection and Attribution of Fake Images Generated by Text-to-Image Diffusion Models", ArXiv Preprint ArXiv:2210.06998v1, p. 1-15, Oct. 13, 2022.

Stöckl "Evaluating A Synthetic Image Dataset Generated With Stable Diffusion", ArXiv Preprint ArXiv:2211.01777v1, p. 1-13, Nov. 3, 2022.

Tan et al. "EfficientNet: Rethinking Model Scaling for Convolutional Neural Networks", International Conference on Machine Learning, Long Beach, CA, USA, Jun. 9-15, 2019, p. 6105-6114, Jun. 9, 2019.

Wang et al. "CNN-Generated Images Are Surprisingly Easy to Spot . . . for Now", Proceedings of the 2020 IEEE/CVF Conference on Computer Vision and Pattern Recognition, CVPR 2020, Seattle, WA, USA, Jun. 13-19, 2020, p. 8695-8704, Jun. 2, 130.

Yang et al. "Diffusion Models: A Comprehensive Survey of Methods and Applications", ArXiv Preprint ArXiv:2209.00796v1, p. 1-23, Sep. 2, 2022.

Yu et al. "Attributing Fake Images to GANs: Learning and Analyzing GAN Fingerprints", Proceedings of the IEEE/CVF International Conference on Computer Vision, ICCV 2019, p. 7556-7566, 2019.

Yun et al. "CutMix: Regularization Strategy to Train Strong Classifiers With Localizable Features", Proceedings of the 2019 IEEE/CVF International Conference on Computer Vision, ICCV, Los Alamitos, CA, USA, Nov. 2019, p. 6022-6031, Nov. 2019.

Zhang et al. "Detecting and Simulating Artifacts in GAN Fake Images (Extended Version).", ArXiv Preprint ArXiv:1907.06515v1, p. 1-7, Jul. 15, 2019.

Zhang et al. "Mixup: Beyond Empirical Risk Minimization", ArXiv Preprint ArXiv:1710.0941212v1, p. 1-11, Oct. 25, 2017.

Zobaed et al. "DeepFakes: Detecting Forged and Synthetic Media Content Using Machine Learning", Artificial Intelligence in Cyber Security: Impact and Implications, Advanced Sciences and Technologies for Security Applications, p. 177-201, Sep. 2021.

\* cited by examiner

| Model | Precision | Recall | F1-score | ROC AUC |
|---|---|---|---|---|
| AI or Not dataset | | | | |
| ResNet-50 (from scratch) | 0.833 | 0.843 | 0.838 | 0.893 |
| ResNet-50 (ImageNet) | 0.898 | 0.959 | 0.927 | 0.937 |
| EfficientNet-b4 (from scratch) | 0.754 | 0.784 | 0.769 | 0.711 |
| EfficientNet-b4 (ImageNet) | 0.891 | 0.915 | 0.903 | 0.958 |
| CLIP ResNet-50 (LAION) + BLIP-2 | 0.937 | 0.946 | 0.941 | 0.983 |
| Proposed approach | 0.990 | 0.993 | 0.991 | 0.998 |
| COCO 2017 + SD-WD combined dataset | | | | |
| ResNet50 (from scratch) | 0.828 | 0.841 | 0.834 | 0.885 |
| ResNet50 (ImageNet) | 0.962 | 0.973 | 0.967 | 0.975 |
| EfficientNet-b4 (from scratch) | 0.716 | 0.688 | 0.702 | 0.726 |
| EfficientNet-b4 (ImageNet) | 0.927 | 0.942 | 0.935 | 0.982 |
| CLIP ResNet-50 (LAION) + BLIP-2 | 0.972 | 0.985 | 0.978 | 0.988 |
| Proposed approach | 0.997 | 0.999 | 0.997 | 0.998 |
| AI or Not + COCO 2017 + SD-WD combined dataset | | | | |
| ResNet50 (from scratch) | 0.831 | 0.842 | 0.836 | 0.893 |
| ResNet50 (ImageNet) | 0.927 | 0.961 | 0.944 | 0.998 |
| EfficientNet-b4 (from scratch) | 0.741 | 0.699 | 0.719 | 0.725 |
| EfficientNet-b4 (ImageNet) | 0.931 | 0.952 | 0.941 | 0.999 |
| CLIP ResNet-50 (LAION) + BLIP-2 | 0.937 | 0.964 | 0.950 | 0.984 |
| Proposed approach | 0.995 | 0.999 | 0.996 | 0.998 |

Table 1.

| OME & WME | Concatenation(OME, WME) | Summation(OME, WME) |
|---|---|---|
| FFC-ResNet-158 & FFC-ResNet-158 | 0.998 | 0.956 |
| FFC-ResNet-158 & FFC-ResNet-101 | 0.986 | 0.943 |
| FFC-ResNet-158 & GFNet-B | 0.973 | 0.933 |
| FFC-ResNet-101 & GFNet-B | 0.972 | 0.921 |
| FFC-ResNet-101 & FFC-ResNet-101 | 0.971 | 0.920 |

Table 2.

Figure 5

DETECTING SYNTHETIC VISUAL MEDIA

FIELD OF INVENTION

The present invention relates to a method for detecting synthetic images and video, and systems and computer programs for carrying out such methods.

BACKGROUND

There has been a recent proliferation in artificial intelligence (AI) tools for the generation and manipulation of images. This enables the production of an increasing volume of convincing synthetic visual media.

Identity verification often requires the submission of images of identity documentation (for instance a passport) and a current photo or video of the subject in question. Malicious actors may generate synthetic visual media to perpetrate fraud or gain access to sensitive information. Synthetic visual media may be manually doctored, may be fully AI generated, or may be AI-manipulated images that are based on an original or genuine image. For example, "deepfake" images or videos, where visual media has been digitally manipulated to replace one person's likeness with that of another, can be used to perpetrate identify theft or gain unauthorised access to services.

Of course, the malicious use of synthetic visual media is not limited to identity verification. Synthetic visual media can be used to: facilitate false advertising, create images of non-existent products in use; enable the spread of disinformation, using a deepfake video impersonating a trusted source, or within social manipulation, presenting images of a sham lifestyle.

Synthetic visual media can be identified by inspection of a skilled individual. However, this is a costly and time-consuming process that requires a great deal of skill, knowledge and training. Additionally, there may be minute differences imperceivable to a human, which may give an indication that a piece of visual media is synthetic. Additionally, as AI tools have been developed for the creation of visual media, AI and machine learning (ML) methods have been developed for their detection. However, standard ML methods may not have any additional understanding of the expected formats of visual media. Therefore, such existing techniques cannot achieve a high rate of accuracy and reliability.

Korean patent application KR 2023 0070660 A discusses extracting information on the boundary between foreground and background objects. However, this process is only applicable when background objects are present and often images used for identity verification require a plane background devoid of any background objects.

Korean patent application KR 102523372 B1 discusses a method where the corneal specular backscatter of eyes in images is analysed to determine if an image is synthetic or genuine. However, this method is only applicable to images that contain a face and may not identify a manipulated image containing a genuine face on an artificially generated background.

US patent application US 2022 121868 A1 discusses separating audio from visual media in order to facilitate deepfake detection. However, this system requires the presence of audio and visual data to properly function.

Chinese patent application CN 115100722 A discusses identifying coordinates of a face (for example the leftmost end of the left eyebrow and the rightmost end of the right eyebrow) to better equip a classifier in identifying a face. However, this requires the image to contain the full face of a subject.

Therefore, there is a need in a system and method that overcomes these problems.

SUMMARY

The present system and method identify synthetic images and video, and can do so at scale or in an automated and more reliable fashion.

Entirely computer-generated visual media, such as images and video may be described as synthetic visual media. Typically, synthetic visual media is produced using generative artificial intelligence (AI) or similar technology. For example, the computer or AI system is provided with a prompt or other description (e.g., textural) of requested visual media and in response, provides a response in the form of a computer file or stream of data forming the visual media. In contrast, genuine visual media is typically created using an optical system, such as a still or video camera that captures objects in the real world. Although a photograph or scan of a printed copy of an AI generated image is created using an optical system, this can still be synthetic media. Additionally, genuine visual media include paintings or human-made digital images and/or videos. Computer processing may still be carried out on genuine visual media (e.g., to sharpen, re-colour, adjust contrast, remove artifacts, adjust the content, etc.) but the origin of genuine visual media is a real subject. The method and system provide an output indicating whether unknown visual media is synthetic or genuine. This output may trigger particular responses or actions (e.g., access to a restricted area, the provision of an electronic service, issue of a verification certificate, etc.) or may form the basis of a report.

Once visual media is provided (e.g., a digital image in the form of a file or data stream), a feature within the visual media is identified. This could be a face, in the case of a portrait or a solid or complete or partially complete object. First and second portions of the visual media are also identified. The first portion contains the feature, and the second portion does not contain the feature. This may be achieved by detecting a boundary of the feature within the visual media. In an example implementation, the first portion may be a foreground of the visual media and the second portion may be a background of the visual media. The portions may be contiguous portions of visual media or may comprise more than one separated areas (e.g., groups of pixels). The background, in particular, may comprise several separate parts of the image, video or visual media. These separate portions are provided to a machine learning (ML) model that has been trained (e.g., using many first and second portions of different items of visual media). The trained ML model provides data indicating whether the provided visual media is synthetic or genuine. Separating out different portions of the visual media in this way provides a more efficient and effective way to determine the synthetic or genuine nature of visual media. The present method and system may take advantage of differences exhibited in the frequency domain of objects, features, foregrounds, and backgrounds of synthetic visual media with genuine visual media.

In accordance with a first aspect, there is provided a method for detecting synthetic visual media, the method comprising the steps of: receiving visual media, wherein the visual media is synthetic visual media or genuine visual media; identifying at least one feature within the visual media; identifying a first portion of the visual media and second portion of the visual media, the first portion of the visual media containing the at least one feature and the second portion of the visual media not including the at least one feature; providing the first portion and the second portion to a trained machine learning (ML) model; and the trained ML model providing data indicating the visual media to be synthetic and/or genuine.

This method utilises a machine learning (ML) or artificial intelligence (AI) model along with the identification of two portions of the visual media. This enables the method to more readily identify synthetic visual media compared to other available methods of detection. The synthetic visual media may be fully AI-generated, AI-manipulated genuine images, or manually created fake visual media (or any combination of these). The applicability of the method to AI-manipulated images is of value in the identification of deep fakes and other fraudulent or dishonest uses of synthetic media, as discussed above. While ML models are discussed, it is readily apparent to the skilled person that AI models could be used interchangeably. The method may also be used to determine a quality or realism of synthetic visual media.

Optionally, the visual media may be an image and/or a video. The method is equally applicable to any type of visual media. The visual media may include a plurality of still images and/or video. The visual media (i.e., non-synthetic visual media) may be captured by a camera or may be manually created (e.g., by a human using a computer, drawing or painting tools). This includes but is not limited to: digital or analogue photography, oil paint on canvas, watercolour paintings, graphite drawings, and/or digital art. Other visual media may be used and considered. Synthetic visual media may be any form of visual media generated by no or a minimum of human input (e.g., a human provided a textual or aural prompt to an AI media generator).

Optionally, the data indicating the visual media to be synthetic and/or genuine may be provided as a probability value. This enables appropriate action to be taken. For example, a particular action (e.g., refusal of an application based on the submitted visual media) may be taken based on the probability value.

Optionally, the method may further comprise the steps of: comparing the data indicating the visual media to be synthetic and/or genuine to a threshold; when the data is above the threshold then providing an output stating that the visual media was synthetically generated; and when the indication is below the threshold then providing an output stating that the visual media is genuine. For example, the visual media may be considered as genuine or non-synthetic below a particular probability value threshold (providing a probability that the visual media is synthetic).

Therefore, a human readable output may be provided that is used to facilitate the user's decision-making process.

Optionally, the method may further comprise the step of extracting the visual media from an application. The visual media may be taken or extracted from other sources. This may include screen capture techniques or image extraction processes.

Optionally, the application may be an identity verification request. Other types of applications may be used.

Optionally, the method may further comprise the step of: when the provided data indicates the visual media is synthetic flagging the visual media as anomalous and/or flagging the application as anomalous. Other actions may be taken based on the outcome of the method.

Advantageously, the method is applicable to media present in applications (e.g., electronic and paper-based). This is due to the potentially high volumes of applications and the associated risks for successful dishonest or fraudulent applications. High volumes may hinder manual detection of synthetic content and incentivise the perpetration of such fraud.

Additionally, the flagging of an application as anomalous may facilitate the detection of fraud and help to reduce costs and improve results and reliability of an application process. False positives may also be reduced as well as reducing the incidence or suspicious applications being missed. This could be an application for a financial institution, or an application used to verify users for all kinds of services that could require identity verification (e.g. phone applications, betting, dating, taxi, rental, sport events, etc). Other applications may be reviewed using this method.

Optionally, the method may further comprise the step of before being provided to the trained ML model, generating embeddings for the first portion of the visual media and the second portion of the visual media. An embedding may be a lower dimensional vector into which can be translated high-dimensional vectors. Embeddings may also be described as numerical representations of real-world objects and that can capture inherent properties and relationships between real-world data. Embeddings may be vectors, for example.

Optionally, the step of generating embeddings may further comprise the step of converting the first portion of the visual media and the second portion of the visual media into the frequency domain. There may be different ways to do this.

Optionally, the step of converting the first portion of the visual media and the second portion of the visual media into the frequency domain may use Fast Fourier Convolution and/or the method may comprise the step of combining the embeddings before they are provided to the trained ML model. The embeddings may optionally be combined by concatenation. Other algorithms or functions may be used for this conversion.

The generation of embeddings may allow greater accuracy. Bespoke embeddings may provide information in a format more readily exploitable by the ML model. In the case of visual media, the use of the frequency domain is of particular relevance as it can capture information related to images in a way that better reflects the manner in which the media was created. The Fast Fourier Convolution may be considered a particularly effective tool for embedding visual media into the frequency domain. Combining embeddings reduces the computational load and facilitates the implementation of ML methods to reduce computing costs associated with the operation of a method to detect synthetic visual media. In particular, concatenation has a relatively low computational load with little or without information loss and as such it has been identified as a preferred tool for this task.

In other embodiments, the combining of embeddings may be done via a simple operation of addition of their values. Use of the sum of the embeddings even further reduces the computational load, but may result in the loss of information, which may lead to a less reliable classification. Depending on the resources and the priorities this may or may not be a viable alternative.

Optionally, the ML model may be a combination of at least one or more ML models comprising: at least one encoder model mapping the first and the second portions to corresponding embeddings; and a classifier model mapping the first portion embedding and the second portion embedding to an indication that the visual media is synthetic.

Optionally, the method may further comprise at least two encoder models, wherein: at least one encoder model may be configured to map the first portion to the first portion embedding; and at least one encoder model is configured to map the second portion to the second portion embedding. Additionally, the at least one encoder model may be a ML model configured to generate embeddings in the frequency domain and/or the at least one encoder model may be a Fast Fourier Convolution Network.

The division of the ML model allows bespoke ML models to be used for different purposes. This enables significantly improved accuracy as the encoder model and classifier model can have wholly different architectures more suited to their separate tasks. The use of two encoder models bespoke to the first portion embedding and second portion embedding can enable greatly improved accuracy with comparable training times.

Additionally, ML models configured to generate embeddings in the frequency domain and Fast Fourier Convolution Networks may be particularly suitable choices for the encoder model.

Optionally, the method may further comprise the step of providing one or more descriptor of the visual media to a trained ML classifier of the ML model. The descriptor may be a textural or other descriptor.

Optionally, the one or more descriptor may be an output of a second trained ML model. In particular, such output could be a vector embedding. Additionally, the method may or may not further comprise the step of combining the visual media descriptor with the first and the second portion embeddings. The visual media descriptor and the first and the second portion embeddings may be combined by concatenation, for example.

Providing a descriptor of the whole image can enhance the performance of the ML model. The descriptor provides information relating to the whole of the visual media (e.g., image) at a macroscopic level. This information may be related to the composition of the visual media, overall brightness/darkness of the visual media, or even the context of the visual media. This may be provided by the output of a trained ML model and/or combined with the first and second portion embeddings. The combination may simply be performed by concatenation, although the skilled person would appreciate that other methods are available. A descriptor may be long text, a vector of numbers, or any other information storage system capable of being interpreted by a trained ML classifier model.

Optionally, the method may further comprise the steps of: before the trained ML model provides data indicating the visual media to be synthetic and/or genuine, identifying one or more additional features in the visual media; for each of the one or more additional features: identifying a first portion of the visual media and second portion of the visual media, the first portion of the visual media containing the one or more additional features and the second portion of the visual media may not include the one or more additional features; and providing the first portion and the second portion to the trained ML model.

Optionally, the method may further comprise the step of selecting a subset of the identified features to be separated into the first portion and the second portion.

This method may be especially suited when identifying partially AI generated images where only certain features are AI generated. For example, when detecting a deep-fake, this can separate the visual media into a portion containing the face and a portion not containing the face. A subset of features may be identified to further focus and improve this method.

Preferably, the first portion may correspond to a foreground of the visual media and the second portion of the visual media may correspond to a background of the visual media. The foreground may be a subject of an image or video (e.g., a person or face). The background may be a portion of a landscape, a room, a backdrop or other features.

It will be readily apparent that this is of particular use in the detection of partially generated AI images wherein the foreground is genuine, and the background is AI generated (or vice versa).

Optionally, the first portion may correspond to one or more subject features of the visual media and the second portion of the visual media may correspond to the features other than the subject features of the visual media. This further improves the method for deep-fake detection. We note that the term subject refers to the main focus of the visual media and not simply to the largest feature (or the largest feature may be detected). For example, visual media may contain only a face and a background. The face may be deemed the subject or main feature regardless of the exact proportion of the visual media containing the face. To provide an example of these concepts, in Joseph Mallord William Turner's "The Fighting Temeraire" the paddle-wheel steam tug may be deemed the subject or main feature, with the eponymous ship occupying a larger portion of canvas but fading into the background.

In accordance with a second aspect, there is provided a method of training any previous ML classification model to detect synthetic visual media, the method comprising the steps of: providing a plurality of genuine visual media; providing a plurality of synthetic visual media; for each visual media in the plurality of synthetic visual media and genuine visual media: identifying at least one feature within the visual media; identifying a first portion of the visual media and second portion of the visual media, the first portion of the visual media containing the at least one feature and the second portion of the visual media not including the at least one feature; providing to an ML model the first and second portions of the visual media; obtaining data from the ML model indicating that the visual media is a synthetic and/or that the visual media is genuine; and based on the data obtained from the AI model and data stating that the visual media is synthetic or genuine, updating the AI model. Training data may be provided or generated data.

It will be apparent to the skilled person that the described ML classification models require bespoke training methods, which are described herein. Additionally, the embodiments may require yet further bespoke training methods which may be apparent to the skilled person. Additionally, it will be apparent to the skilled person that the choice of training data will impact performance of the described ML models in different scenarios. Training data may include, but is not limited to: photographs or videos of people and/or real-world objects; scans or photographs of paintings; fully or partially AI-generated art; and AI-manipulated visual media.

Optionally, the data obtained from the ML model indicating the visual media to be synthetic and/or genuine may comprise a probability value.

Optionally, the first portion and the second portion of the visual media may be transformed into the frequency domain to form embeddings. This training method enables the advantageous benefits of capturing frequency domain information.

Optionally, the ML model may be a combination of at least one or more ML models comprising: at least one encoder model mapping the first and second portions to corresponding embeddings; and a classifier model mapping the first portion embedding and the second portion embedding to an indication on if the visual media is synthetic.

Optionally each of the one or more ML models may be updated based on the data obtained from the ML model and data stating that the visual media is synthetic or genuine. This enables the training of a ML classifier comprising several different ML models.

Optionally, for each visual media in the plurality of synthetic visual media and genuine visual media, one or more descriptor of the visual media from a trained ML classifier may be provided to the ML model. This enables the training of a ML classifier, which includes a descriptor of the whole image to also be provided and thus achieve the advantageous benefits discussed above.

In accordance with a third aspect, there is provided a non-transitory computer-readable medium storing instructions that, when read by an apparatus, cause the apparatus to: on receipt of visual media, wherein the visual media is synthetic visual media or genuine visual media; identifying at least one feature within the visual media; identifying a first portion of the visual media and second portion of the visual media, the first portion of the visual media containing the at least one feature and the second portion of the visual media not including the at least one feature; providing the first portion and the second portion to a trained machine learning (ML) model; and the trained ML model providing data indicating the visual media to be synthetic and/or genuine.

In accordance with a further aspect, there is provided a non-transitory computer-readable medium storing instructions that, when read by an apparatus, cause the apparatus to take the steps of any previous method.

In accordance with a further aspect, there is provided apparatus comprising one or more processors; and memory storing computer-executable instructions that, when executed by the processor, cause the apparatus to carry out the steps of any previous method.

The methods described above may be implemented as a computer program comprising program instructions to operate a computer. The computer program may be stored on a computer-readable medium, including a non-transitory computer-readable medium.

The computer system may include a processor or processors (e.g., local, virtual or cloud-based) such as a Central Processing Unit (CPU), and/or a single or a collection of Graphics Processing Units (GPUs). The processor may execute logic in the form of a software program. The computer system may include a memory including volatile and non-volatile storage medium. A computer-readable medium (CRM) may be included to store the logic or program instructions. For example, embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid state disk), a compact disc (CD), a digital versatile disc (DVD), a floppy disk, a cartridge, and/or a magnetic tape. The different parts of the system may be connected using a network (e.g. wireless networks and wired networks). The computer system may include one or more interfaces. The computer system may contain a suitable operating system such as UNIX, Windows (RTM) or Linux, for example.

It should be noted that any feature described above may be used with any particular aspect or embodiment of the invention.

BRIEF DESCRIPTION OF FIGURES

The present invention may be put into practice in a number of ways and embodiments will now be described by way of example only and with reference to the accompanying drawings, in which:

FIG. 5 shows tables providing example results from the methods of FIGS. 1 and 3.

It should be noted that the figures are illustrated for simplicity and are not necessarily drawn to scale. Like features are provided with the same reference numerals.

DETAILED DESCRIPTION OF EMBODIMENTS OF THE INVENTION

Whilst the quality of AI-generated (synthetic images) images has increased, it has become more difficult to identify which images are genuine and which are synthetic. Studies have shown that detectors trained on images created using generative adversarial network (GAN) models are not efficient at identifying images created by diffusion models.

Figure 1:
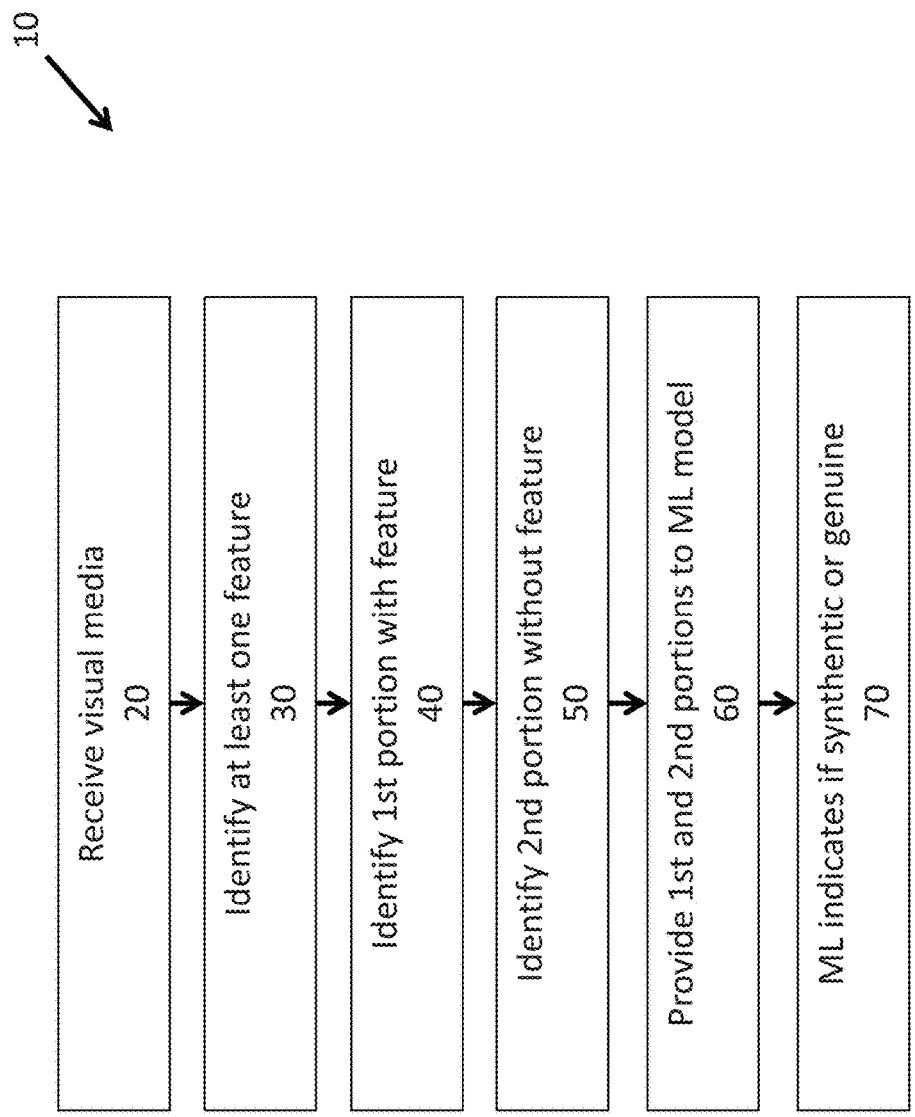
FIG. 1 shows a flowchart of a method for detecting synthetic images using a machine learning (ML) model.

FIG. 1 illustrates at a high level, a method 10 for detecting synthetic visual media when presented with visual media of unknown origin. At step 20, visual media is received. This may be a digital file or as a data stream. The visual media may be an image, a plurality of images or a video (with or without audio). At step 30, at least one feature is identified within the visual media. This may be a subject of the visual media or one of a plurality of subjects. The feature may be identified using any suitable technique, such as boundary identification, contrast mapping, etc. The feature may be a most prominent feature and/or largest in the visual media, for example. However, it is not always necessary to detect the largest feature as the identified feature.

At step 40, a first portion of the visual media (e.g., image) is identified. This first portion contains the feature identified in step 30. At step 50, a second portion of the visual media is identified. The second portion does not contain the feature (or plurality of features) identified in step 30. The first and second portions may be identified using a segmentation model or any suitable technique, for example.

At step 60, the first and second portions of the visual media are provided to a machine learning (ML) model that has been previously trained. The training of the ML model is described below and within Annex 1.

The ML model provides an indication and/or data used to indicate that the visual media is synthetic or genuine at step 70. The data may take different forms. For example, the data may be a percentage indicating the confidence level that the visual media is synthetic or genuine. A consumer of this information may compare the data to one or more thresholds to determine a binary outcome (e.g., synthetic/genuine). However, the data may be used in different ways and may trigger a further action based in its value. The method 10 may be implemented using a computer system in different forms, including a neural network, for example.

Figure 2:
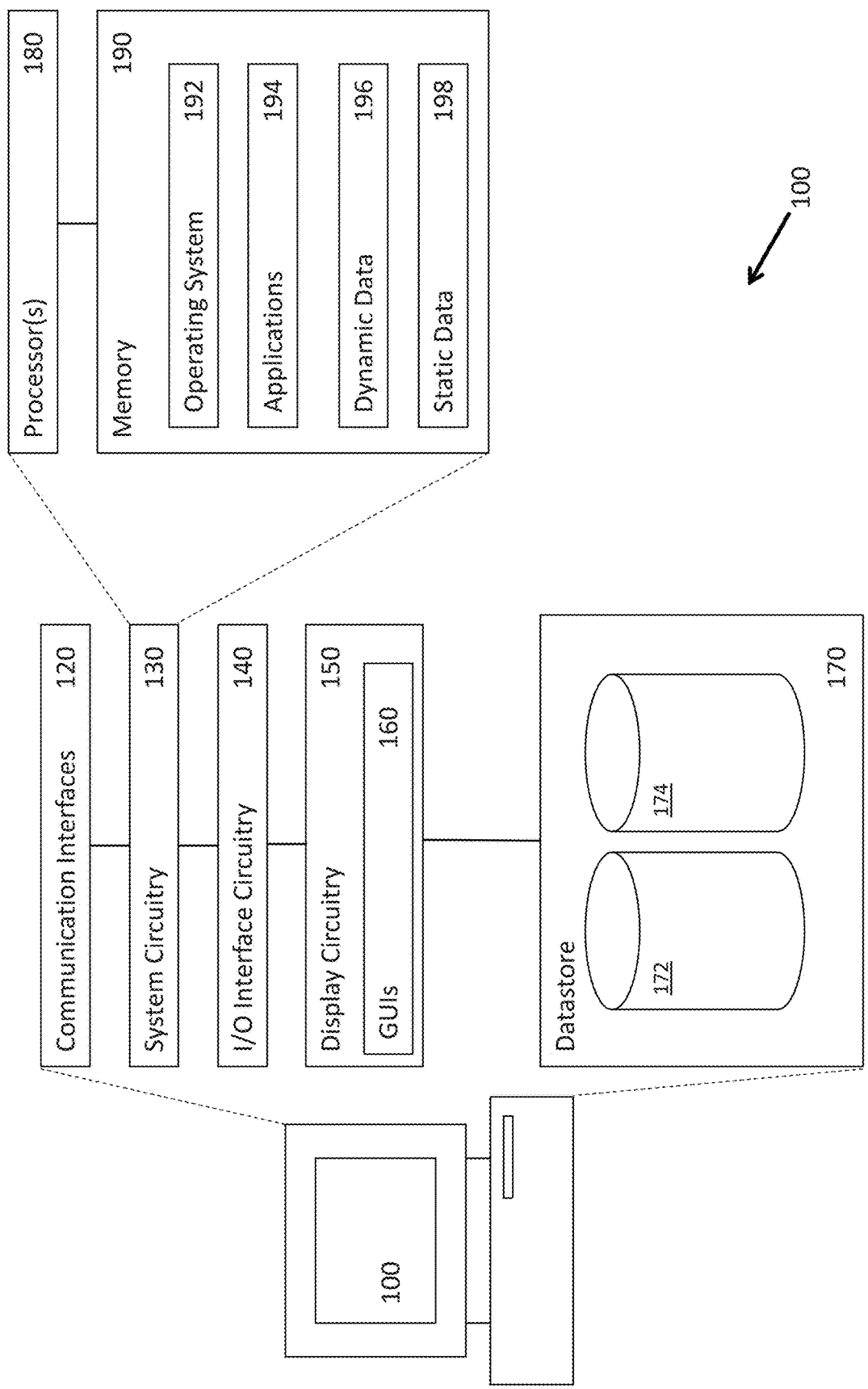
FIG. 2 shows a schematic diagram of a computer system used to implement the method of FIG. 1, given by way of example only.

As shown in FIG. 2, the computer system 100 includes a number of components including communication interfaces 120, system circuitry 130, input/output (I/O) circuitry 140, display circuitry and interfaces 150, and a datastore 170. The system circuitry 120 can include one or more processors or CPUs 180 and memory 190. The system circuitry 130 may include any combination of hardware, software, firmware, and/or other circuitry. The system circuitry 130 may be implemented, with one or more systems on a chip (SoC), application specific integrated circuits (ASIC), microprocessors, and/or analogue and digital circuits.

The display circuitry may provide one or more graphical user interfaces (GUIs) 160 and the I/O interface circuitry 140 may include touch sensitive or non-touch displays, sound, voice or other recognition inputs, buttons, switches, speakers, sounders, and other user interface elements. The I/O interface circuitry 140 may include microphones, cameras, headset and microphone input/output connectors, Universal Serial Bus (USB) connectors, and SD or other memory card sockets. The I/O interface circuitry 140 may further include data media interfaces (e.g., a CD-ROM or DVD drive) and other bus and display interfaces.

The memory 190 may include volatile (RAM) or non-volatile memory (e.g., ROM or Flash memory). The memory may store the operating system 192 of the computer system 100, applications or software 194, dynamic data 196, and/or static data 198. The datastore or data source 170 may include one or more databases 172, 174 and/or a file store or file system, for example.

The method and system may be implemented in hardware, software, or a combination of hardware and software. The method and system may be implemented either as a server comprising a single computer system or as a distributed network of servers connected across a network. Any kind of computer system or other electronic apparatus may be adapted to carry out the described methods.

Figure 3:
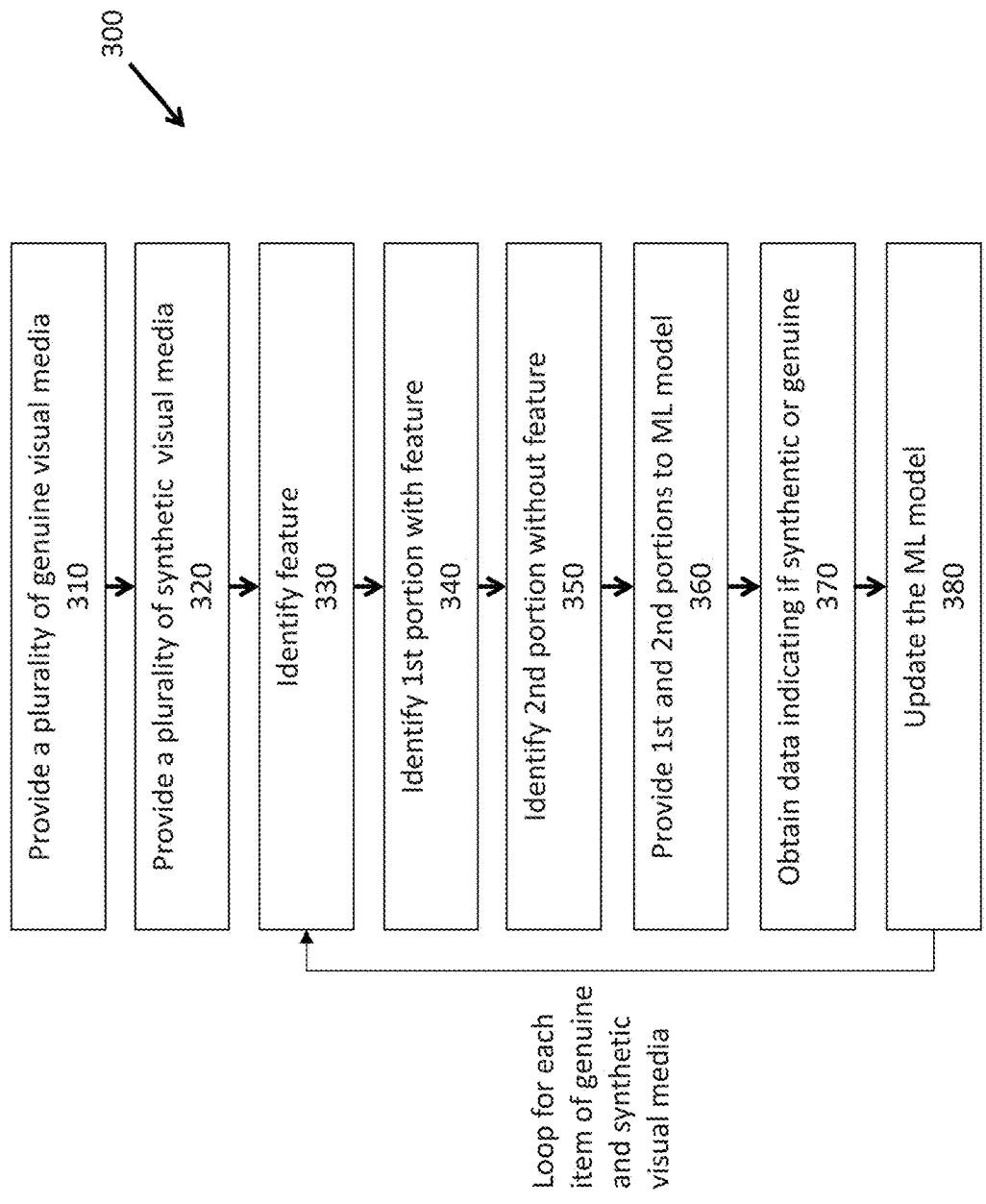
FIG. 3 shows a flowchart of a method for training the ML model of the method of FIG. 1.

The computer system 100 may also be used to implement the method 300 illustrated schematically in FIG. 3. This is the method 300 for training the ML model described with reference to FIG. 1.

A plurality of genuine visual media is provided to the ML model at step 310. Furthermore, a plurality of synthetic visual media is provided to the ML model at step 320. This may be achieved as a single step of combined synthetic or genuine visual media. The visual media of both types may be obtained from any suitable source, including standard training data sets. The ML model is provided with an indication as to the type of visual media when they are provided. The plurality of genuine and synthetic media may be provided in any order.

The method 300 loops through each visual media (e.g., image file) until they are all processed. The loop starts with step 330 and ends with step 380. At step 330, at least one feature is identified within the current item of visual media. As with the method described with reference to FIG. 1, this feature may be a subject of the visual media or one of a plurality of subjects. The feature may be identified using any suitable technique, such as boundary identification, contrast mapping, etc. The feature may be a most prominent feature in the visual media, for example. It is not necessary to process all visual media in the training data. The loop may complete based on a suitable criterion (e.g., a particular number of files processed or when parameters of the model change below a threshold for additional items of visual media).

At step 340, a first portion of the visual media (e.g., image) is identified. This first portion contains the feature identified in step 330. At step 350, a second portion of the visual media is identified. The second portion does not contain the feature identified in step 30. The first and second portions may be identified using a segmentation model, for example.

At step 360, the first and second portions of the visual media are provided to a machine learning (ML) model. At step 370, the ML model is provided with data indicating whether or not the current visual media is synthetic or genuine. The ML model is updated at step 380, with the loop repeating until all items of visual media are processed (or a suitable number have been processed). The resultant trained ML model is used in the method 10, described with reference to FIG. 1.

Figure 4:
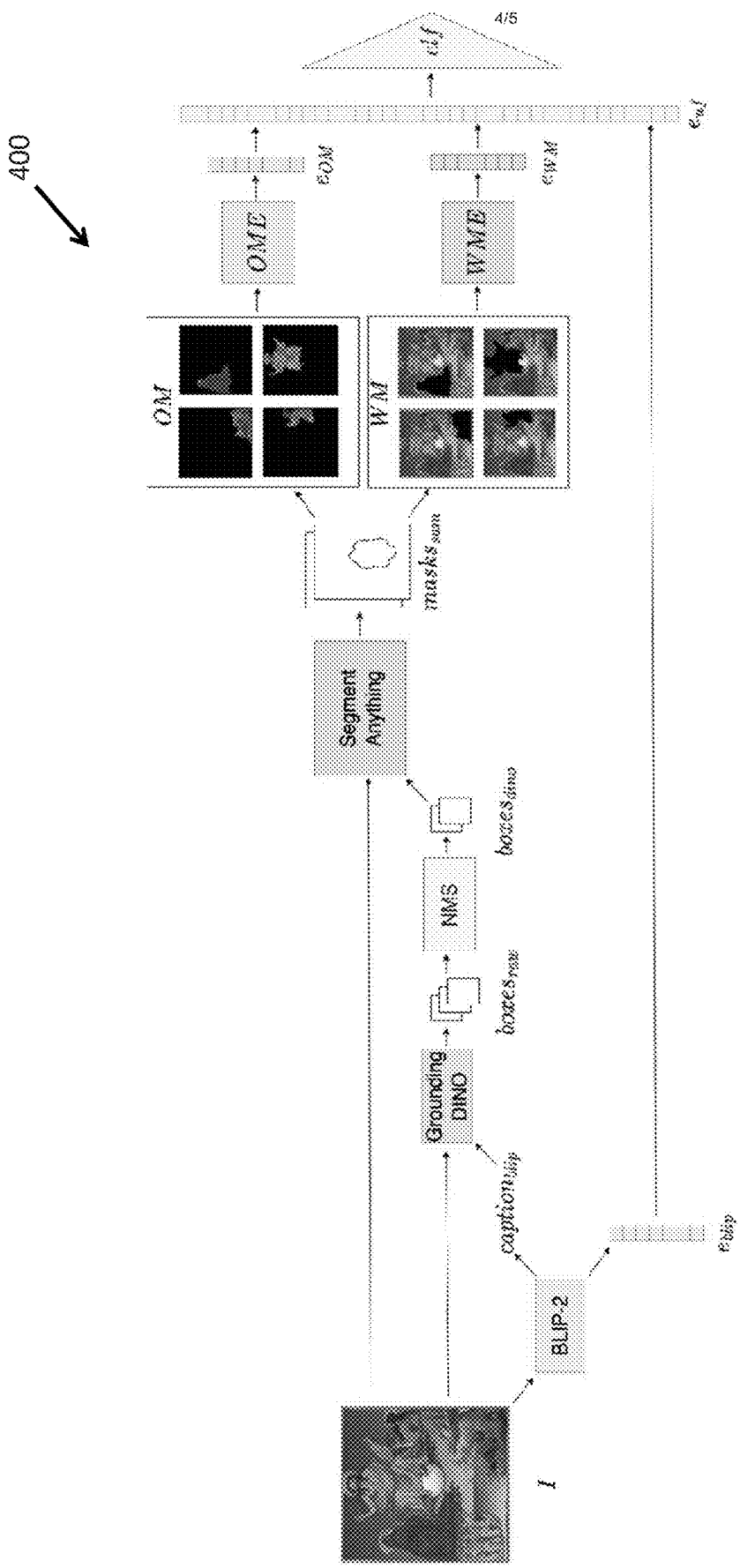
FIG. 4 shows a schematic diagram illustrating in more detail the method of FIG. 1.

FIG. 4 shows a schematic diagram providing additional details of the method. The method 400 of FIG. 4 provides an example implementation, although variations may be made. The method 400 uses a combined neural network architecture, incorporating an attention mechanism, spectral analysis, and multi-modal encoders as components. The multi-modal encoders extract common characteristic features from the image or other visual media. The multi-modal encoders possess an expressive ability in combining text and image modalities.

Spectral analysis is used with segmentation to take advantage of the concept that synthetic image generation procedures are based on the creation of both a central object or feature and a background of a scene. This leads to a frequency characteristic ratio that differs between genuine or real visual media and generated or synthetic visual media (especially images).

A spectral encoder may be incorporated as part of a combined architecture with central object segmentation. An attention mechanism is also present in the architecture to account for locality properties or a plurality of artifact characteristic of synthetic images. This may include accumulation of artifacts in the vicinity of contours of a central object or feature (e.g., a person or face).

Detecting AI-generated images of any kind is an important facility that may be used for identity verification, fraud detection, forensics, fake news, fake accounts detection, and plagiarism detection. The system and method may be used with different types of visual media including still images and video.

FIG. 4 shows schematically a method 400 for carrying out an image analysis algorithm as well as an example neural network architecture. The high-level neural network consists of one or more lower-level ML models. The lower-level ML models may include pre-trained freezed models, such as BLIP-2 and DINO, as well as bespoke or novel trained unfreezed models, such as the encoders OME and WME and the classifier (clf) that generates the clf value that is the final output that denotes the probability of the input image being AI-generated.

The following definitions are used in this example implementation:
  BLIP-2 model-Bootstrapping Language-Image Pre-training, is an AI model that can perform various multi-modal tasks like visual question answering, image-text retrieval (image-text matching) and image captioning;

DINO-a grounded version of DINO, which is a self-supervised system by Facebook AI that is able to learn representations from unlabelled data;

NMS-non-maximum suppression technique, which is a post-processing technique used in object detection to eliminate duplicate detections and select the most relevant detected objects. This helps reduce false positives and the computational complexity of a detection algorithm;

Segment Anything Model (SAM)-which is a model designed to generate high-quality object masks based on various input prompts;

OM is a subset of image parts belonging to the input image foreground, feature, or object (contains at least one image). OM is a first portion of the visual media containing at least one feature;

WM is a subset of image parts belonging to the input image background (contains at least one image). WM is a second portion of the visual media that does not contain the at least one feature;

OME and WME are neural networks designed to generate embeddings for the OM and WM subset images respectively, preferably on the basis of Fast Fourier Convolution (FFC) operations. The OME encoder may be trained on foreground images (or images of features or objects, such as faces) and the WME encoder may be trained on background images (e.g., images without close up objects, such as landscapes). In other example implementations, one single encoder may be used to generate embeddings for both the foreground and background images or portions of the same images. However, two encoders optimised for the foreground (OM) and background (WM) portions of images operate more efficiently and effectively.

As shown in FIG. 4, the method 400 consists of several steps. A preparatory stage I (steps 1 to 4 described below) obtains full image embedding $e_{blip}$ (using the BLIP-2 model), which generates foreground and background elements from the image. These may be described as a first portion and a second portion of the image, respectively. As shown in FIG. 4, this results in image subsets or portions OM and WM). An analysis stage II (steps 5 and 6) provides an output or data indicating a probability that the image is synthetic or AI-generated.

The steps in stage I provide the OM and WM subsets but these can be obtained in different ways. Furthermore, different ML models may be used to generate the full input image embedding. The lower-level ML models used for stage II are preferably custom made but can be standard.

The following describes the steps of FIG. 4 in more detail:

1. Image captions and embedding are extracted using the BLIP-2 model.

The BLIP-2 model generates accurate textual descriptions of the main objects or features in an image. Other models may be used to generate a descriptor or textural description of at least one feature or object in the visual media. For example, the textural description may be "a person", "a man", "a woman", "a middle-aged person", "an animal", "a building", etc. Furthermore, this step generates an embedding for the image ($e_{blip}$). Preferably, this is a 1D vector embedding. In different example implementations other models can be used to generate the embedding.

2. One or more objects or features are detected in the image or other visual media, grounded by image captions or descriptors from the first stage.

In this example implementation, DINO takes both the input visual media (e.g., image) and its textual description or descriptor and uses a suitable advanced deep learning architecture to produce bounding boxes for the main objects or features in the image. By incorporating the textual prompt, the model effectively learns to associate visual features with semantic descriptions.

To handle cases of overlapping bounding boxes and reduce the number of redundant detections, a non-maximum suppression (NMS) technique may be used. NMS selects the most confident bounding boxes while suppressing overlapping ones. This process ensures that only the most relevant and accurate bounding boxes are retained to improve the object or feature detection results.

As a result of this stage, a set of bounding boxes is obtained that indicate the location of one or more main objects or features in the input image. The method 400 can also identify portions of the visual media that do not contain the one or more features.

3. A segmentation model uses the available or identified bounding boxes to provide regions or portions that contain the one or more object or features in the image. Segment anything model (SAM) from Meta AI may be used to process the input bounding boxes and the visual media (image) to generate a set of masks. These masks represent the segmented regions corresponding to the main objects in the image. Each mask accurately delineates the shape and boundaries of a specific object or feature, enabling further analysis and classification tasks.

4. Regions or portions of the visual media containing the objects or features, and the background portion or region are created. This may be described as a masking stage. From the obtained masks, two subsets (or portions) of the image are formed. OM (object mask) and WM (background mask).

The OM subset or portion of the visual media may be obtained by element-wise multiplication between the input image and each mask. The WM subset or portion of the visual media may be obtained by subtracting the corresponding elements of the OM subset from the input or original visual media (e.g., image). These two subsets (e.g., of pixels), OM and WM, are created to facilitate separate analysis of the regions inside and outside the main objects or features in the input image. Each subset includes at least one image or image portion.

5. The regions are analysed in the frequency domain. A Fourier transform (FT) is used to convert images into the frequency domain. Two encoders are used to perform this operation on the two portions (OME and WME). These two encoders consist of neural networks that use the FT as their underlying operation. The encoders use fast Fourier convolution (FFC) internally. The FFC operator utilises fundamental concepts of Fourier analysis to enable efficient non-local receptive fields and multi-scale feature fusion. By utilising spectral analysis, FFC achieves global context capture and spatial information fusion.

OME produces a set of embeddings for the current image in the OM subset. WME produces a set of embeddings for the current image in the WM subset. Both subsets of vectors are averaged to produce embeddings $e_{OM}$ and $e_{WM}$. The embeddings represent image features that were obtained from the frequency domain, e.g., via FFT.

Preferably, both encoders have identical architecture (described below), but the OME encoder may be trained on foreground images (or portions) and the WME encoder may be trained on background images or portions. Therefore, the underlying ML models will typically comprise different weights.

In other example implementations one single encoder can be used to generate embeddings for both the foreground and background images. However, two dedicated encoders customised for the foreground and background images improve the method.

In other example implementations this stage can take different forms. For example, the method may first transform the images into a Fourier spectrum representation and then generate embeddings for the transformed images using one of more conventional convolutional neural network (CNN) models. However, test results show that use of FFC encoders yield better results.

6. During this stage, the embeddings from the first and fifth stages are combined and fed into a classifier. This step involves concatenating three embeddings: $\Theta_{blip}$, $\Theta_{OM}$, and $e_{WM}$, to create a unified feature vector $e_{uf}$ that describes all the characteristics of the images. The unified feature vector $e_{uf}$ contains comprehensive information about the image, including the textual description from the BLIP-2 model, the segmented main objects on a black background from the OME, and the image without the main object(s) or feature(s) from the WME. Once this combined feature embedding is formed, the image is classified based on this vector. This uses one linear layer as the head of the model. The classifier generates a clf value from 0 to 1 that denotes a probability that the image is AI-generated or otherwise synthetic. 0 means a 0% chance or confidence level and 1 means a 100% probability. An example threshold at this inference stage may be set as 0.5 but may be different, dependent on scenario and risk profile required by the decision.

The following provides additional details of the Fourier transform encoders. As discussed previously, the FFC encoder may be used. One of the most common models in deep learning (DL) uses ResNet blocks (see ResNet (Deep Residual Learning for Image Recognition, Kaiming He, Xiangyu Zhang, Shaoqing Ren, Jian Sun). In the present example implementation, FFC ResNet blocks are used to create a model, which may be based on the ResNet-158 variant (there are many options with the similar architecture, but having different numbers of layers). The classifier is preferably a one linear layer.

Mathematically, the FFC process can be described as follows:

Given an input feature map X with dimension H×W×C:
1. Split X into local (X) and global (X) parts along a channel dimension.
2. Update the local branch, $Y_{i \to i}$, through regular spatial convolution on $X_i$ and $X_g$.
3. Update the global branch, $Y_{g \to g}$, through Fourier transforms, pointwise convolutions on the Fourier spectrum, and inverse Fourier transforms on $X_g$ and regular convolutions on $X_i$.
4. Combine the local and global branches to obtain the final output Y.
5. Concatenate the outputs from both branches to obtain the final output Y.

More detail on this mathematical process may be found in Annex 1.

The model may be trained using one or more datasets. One dataset of images, some of which are AI-generated may be formed by dividing or splitting into:
12000 labelled images as training set.
6000 images as test set
(other numbers of images in the dataset may be used).

A second example dataset may be a combination of real-world or genuine images from COCO2017 and AI-generated images from Stable Diffusion Wordnet Dataset (SD-WD), split into a combination of 200 000 images for training and 40 000 images for testing.

Baselines: ResNet-50 and EfficientNetb4 in two variants, may be trained from scratch and pre-trained on ImageNet. Tables 1 and 2 in FIG. 5 show example results using these datasets. Table 1 shows results including a comparison between baseline results and results obtained according to an example implementation of the method and system. Table 2 shows example results of receiver operating characteristic curve-area under the curve (ROC-AUC) metrics on synthetic/genuine visual media. CLIP ResNet-50 was used and pre-trained on the LAION dataset. Embeddings from CLIP were also merged with embeddings from BLIP-2 and used in the classifier.

Each model may be trained for approximately 30 epochs using early stopping, for example. Other training periods may be used. It has been determined that a batch size of 32 provided an optimum performance. To optimize training, the AdamW optimiser with a learning rate of 0.005 may be used. The CosineAnnealingLR scheduler may be used to dynamically adjust the learning rate throughout training.

To increase the diversity and robustness of the models, various data augmentation techniques may be applied. These include HorizontalFlip, which flips input images horizontally; RGBShift, which randomly shifts the values of the red, green, and blue channels to introduce colour variations. Other variations may be used to increase the size of training datasets.

Other variations may be generated using for example: A RandomBrightnessContrast process, which randomly adjust the brightness and contrast of the images; Mixup, which combines pairs of training examples by linearly interpolating their features and labels; and Cutmix, which replaces a portion of one image with a portion from another image to encourage the model to learn from different parts of the input space. These augmentations aim to improve diversity and generalization. The models may use a cluster with multiple NVIDIA T4 16 GB GPU workers, for example. Other processor configurations may be used.

As used throughout, including in the claims, unless the context indicates otherwise, singular forms of the terms herein are to be construed as including the plural form and vice versa. For instance, unless the context indicates otherwise, a singular reference herein including in the claims, such as "a" or "an" (such as an ion multipole device) means "one or more" (for instance, one or more ion multipole device). Throughout the description and claims of this disclosure, the words "comprise", "including", "having" and "contain" and variations of the words, for example "comprising" and "comprises" or similar, mean "including but not limited to", and are not intended to (and do not) exclude other components. Also, the use of "or" is inclusive, such that the phrase "A or B" is true when "A" is true, "B is true", or both "A" and "B" are true.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

The terms "first" and "second" may be reversed without changing the scope of the disclosure. That is, an element termed a "first" element may instead be termed a "second" element and an element termed a "second" element may instead be considered a "first" element.

Any steps described in this specification may be performed in any order or simultaneously unless stated or the context requires otherwise. Moreover, where a step is described as being performed after a step, this does not preclude intervening steps being performed.

It is also to be understood that, for any given component or embodiment described throughout, any of the possible candidates or alternatives listed for that component may generally be used individually or in combination with one another, unless implicitly or explicitly understood or stated otherwise. It will be understood that any list of such candidates or alternatives is merely illustrative, not limiting, unless implicitly or explicitly understood or stated otherwise.

Unless otherwise described, all technical and scientific terms used throughout have a meaning as is commonly understood by one of ordinary skill in the art to which the various embodiments described herein belongs.

As will be appreciated by the skilled person, details of the above embodiment may be varied without departing from the scope of the present invention, as defined by the appended claims. For example, different training data and ML models may be used.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The following numbered clauses provide further example implementations:

1. A method for detecting synthetic visual media, the method comprising the steps of:
   receiving visual media, wherein the visual media is synthetic visual media or genuine visual media;
   identifying at least one feature within the visual media;
   identifying a first portion of the visual media and second portion of the visual media, the first portion of the visual media containing the at least one feature and the second portion of the visual media not including the at least one feature;
   providing the first portion and the second portion to a trained machine learning (ML) model; and
   the trained ML model providing data indicating the visual media to be synthetic and/or genuine.

2. The method of clause 1, wherein the visual media is an image or a video.

3. The method of clause 1 or clause 2, wherein the data indicating the visual media to be synthetic and/or genuine comprises a probability value.

4. The method according to any previous clause further comprising the steps of: comparing the data indicating the visual media to be synthetic and/or genuine to a threshold;
   when the data is above the threshold then providing an output stating that the visual media was synthetically generated; and
   when the indication is below the threshold then providing an output stating that the visual media is genuine.

5. The method according to any previous clause further comprising the step of extracting the visual media from an application.

6. The method of clause 5 wherein the application is an identity verification request.

7. The method of clause 5 or clause 6 further comprising the step of when the provided data indicates the visual media is synthetic flagging the visual media as anomalous and/or flagging the application as anomalous.

8. The method according to any previous clause further comprising the step of before being provided to the trained ML model generating embeddings for the first portion of the visual media and the second portion of the visual media.

9. The method of clause 8, wherein the step of generating embeddings further comprises the step of converting the first portion of the visual media and the second portion of the visual media into the frequency domain.

10. The method of clause 9, wherein the step of converting the first portion of the visual media and the second portion of the visual media into the frequency domain uses Fast Fourier Convolution.

11. The method of clause 8 or clause 9 further comprising the step of combining the embeddings before they are provided to the trained ML model.

12. The method of clause 11, wherein the embeddings are combined by concatenation.

13. The method according to any previous clause, wherein the ML model is a combination of at least one or more ML models comprising:
   at least one encoder model mapping the first and the second portions to corresponding embeddings; and
   a classifier model mapping the first portion embedding and the second portion embedding to an indication that the visual media is synthetic.

16. The method of clause 15 further comprising at least two encoder models, wherein:
   at least one encoder model is configured to map the first portion to the first portion embedding; and
   at least one encoder model is configured to map the second portion to the second portion embedding.

17. The method of clause 15 or clause 16, wherein the at least one encoder model is a ML model configured to generate embeddings in the frequency domain.

18. The method according to any of clauses 15 to 17, wherein the at least one encoder model is a Fast Fourier Convolution Network.

19. The method according to any previous clause further comprising the step of providing one or more descriptor of the visual media to a trained ML classifier of the ML model.

20. The method of clause 19, wherein the one or more descriptor is an output of a second trained ML model.

21. The method of clause 19 or clause 20 further comprising the step of combining the visual media descriptor with the first and the second portion embeddings.

22. The method of clause 21, wherein the visual media descriptor and the first and the second portion embeddings are combined by concatenation.

23. The method according to any previous clause further comprising the steps of:
   before the trained ML model provides data indicating the visual media to be synthetic and/or genuine identifying one or more additional features in the visual media;
   for each of the one or more additional features:
   identifying a first portion of the visual media and second portion of the visual media, the first portion of the visual media containing the one or more additional features and the second portion of the visual media not including the one or more additional features; and
   providing the first portion and the second portion to the trained ML model.

24. The method of clause 23 further comprising selecting a subset of the identified features to be separated into the first portion and the second portion.

25. The method according to any previous clause, wherein the first portion is a foreground of the visual media and second portion of the visual media is a background of the visual media.

26. The method according to any previous clause, wherein the first portion corresponds to one or more subject features of the visual media and second portion of the visual media corresponds to the features other than the subject features of the visual media.

27. A method for training a machine learning (ML) model to detect synthetic visual media, the method comprising the steps of:
- providing a plurality of genuine visual media;
- providing a plurality of synthetic visual media;
- for each visual media in the plurality of synthetic visual media and genuine visual media:
  - identifying at least one feature within the visual media;
  - identifying a first portion of the visual media and second portion of the visual media, the first portion of the visual media containing the at least one feature and the second portion of the visual media not including the at least one feature;
  - providing to an ML model the first and second portions of the visual media;
  - obtaining data from the ML model indicating that the visual media is a synthetic and/or that the visual media is genuine; and
  - based on the data obtained from the ML model and data stating that the visual media is synthetic or genuine, updating the ML model.

28. The method of clause 27, wherein the data obtained from the ML model indicating the visual media to be synthetic and/or genuine comprises a probability value.

29. The method of clause 27 or clause 28, wherein for each visual media in the plurality of synthetic visual media and genuine visual media before being provided to the ML model transforming the first portion and the second portion of the visual media into the frequency domain to form embeddings.

30. The method according to any of clauses 27 to 29, wherein the ML model is a combination of at least one or more ML models comprising:
- at least one encoder model mapping the first and second portions to corresponding embeddings; and
- a classifier model mapping the first portion embedding and the second portion embedding to an indication on if the visual media is synthetic.

31. The method of clause 30, wherein each of the one or more ML models may be updated based on the data obtained from the ML model and data stating that the visual media is synthetic or genuine.

32. The method according to any of clauses 27 to 31, wherein for each visual media in the plurality of synthetic visual media and genuine visual media, one or more descriptor of the visual media from a trained ML classifier is provided to the ML model.

33. A non-transitory computer-readable medium storing instructions that, when read by an apparatus, cause the apparatus to:
- on receipt of visual media, wherein the visual media is synthetic visual media or genuine visual media;
- identifying at least one feature within the visual media;
- identifying a first portion of the visual media and second portion of the visual media, the first portion of the visual media containing the at least one feature and the second portion of the visual media not including the at least one feature;
- providing the first portion and the second portion to a trained machine learning (ML) model; and
- the trained ML model providing data indicating the visual media to be synthetic and/or genuine.

ANNEX 1

Merging Attention and Spectral Analysis for Synthetic Images Recognition

This annex provides additional technical details of the ML model training and use, including particular mathematical and computing techniques that may be used within the described system and method.

Merging Attention and Spectral Analysis for Synthetic Images Recognition

Paper ID *****

Abstract

*Recent advancements in image generation have led to a wide range of applications. Unfortunately, there is also a worrying trend of malicious use of generated or synthetic images, including the creation of deep fakes.*

*This paper proposes an approach to recognizing synthetic images using spectral encoders and self-attention. The approach demonstrates promising results on several datasets.*

1. Introduction

In recent years, image generation technologies have made significant progress. These mechanisms can create photorealistic synthetic images that are free of visible artifacts. Various methods have been developed, including GANs [3, 10], Stable Diffusion [21], DALL-E [19], Latent Diffusion [21], and more.

While image generation has many creative applications, it can also be used in harmful ways, such as creating misinformation. One recent trend is the creation of deep fakes using fully generated face images. The most common types of electronic fraud involve falsifying photo IDs and replacing faces during verification procedures. The trend in increasing fraud with synthetic face images has been reported in the past few years [1].

Recognition methods for artificially generated images lag behind the development of generation methods. This has resulted in a situation where the balance between generative tools and artificial image recognition methods has shifted in favor of the former, especially with the current development of image generation methods using diffusion models.[2]

We believe that it is essential not only to develop and share detectors for artificial content but also to explore various ways to tackle this problem. In this paper, we explore a simple idea that the objects and background of a generated image differ in the frequency domain.

Our approach, which utilizes spectral analysis, shows promising results across several datasets, including the one used in the recent competition.

2. Related Work

Progress has been made in detecting generated images, with much of the effort focused on Generative Adversarial Networks (GANs) [27, 25, 9, 31]. Recently, [4] studied the forensics traces left by diffusion models and examined how detectors, developed for GAN-generated images, performed on images generated with diffusion models [26].

The recent work focusing specifically on text-to-image models such as Stable Diffusion [21] was DE-FAKE [22], which leveraged Contrastive Language-Image Pre-Training (CLIP) [6] and proposed an approach for identifying synthetic images generated with text-to-image models. The authors not only offer an approach to recognizing generated images, but also a method for determining the generating model based on the establishment of regularities in the generated artifacts. [12] studied the artifacts generated by diffusion models and GANs in the domain of deep fake detection.

Extensive studies [5] showed that detectors trained only on GAN images perform poorly on images generated with other models, such as diffusion models.

Research has also been conducted in the area of frequency domain analysis for synthetic image detection. [30] proposed using the frequency spectrum instead of image pixels as input for classifier training. [8] demonstrated that artifacts caused by upsampling operations found in all current GAN architectures can be identified using the frequency representation to detect deep fake images.

3. Proposed Approach

We propose a combined neural network architecture for recognizing synthetic images. Our architecture incorporates the attention mechanism, spectral analysis, and multi-modal encoders as components.

---
[1] https://www.finextra.com/blogposting/23223/why-deepfake-fraud-losses-should-scare-financial-institutions
[2] https://www.wired.com/story/deepfakes-not-very-good-nor-tools-detect/

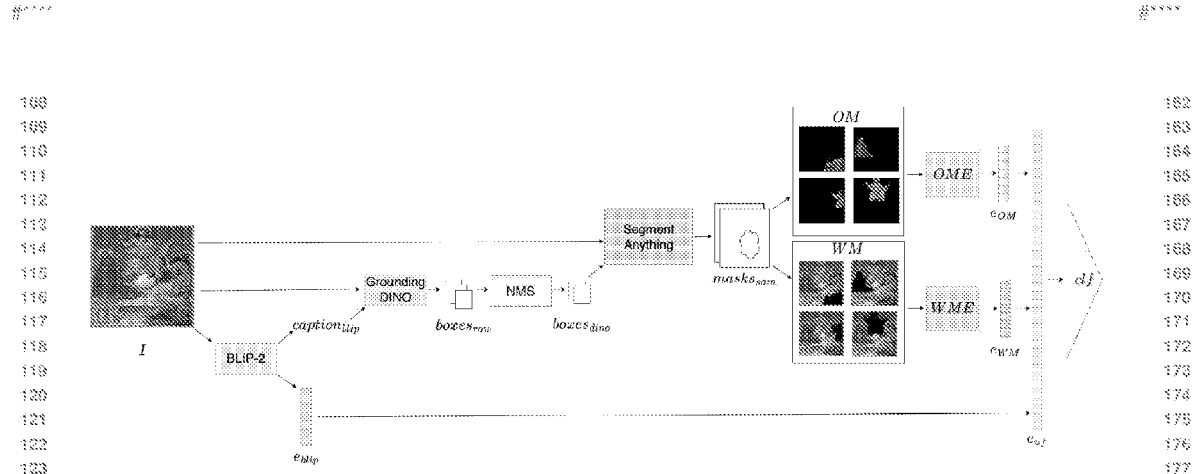

Figure 1. The scheme of the approach. We segment the image and then analyse its regions in frequency domain.

The multi-modal encoders are utilized to extract common characteristic features from the image. They possess great expressive ability in combining text and image modalities. Spectral analysis is used with segmentation to address the idea that image generation procedures are based on the creation of both the central object and the general background of the scene. This leads to a frequency characteristic ratio that differs from those of actual images.

To address this, we incorporated a spectral encoder as part of our combined architecture in conjunction with central object segmentation. Finally, we employed the attention mechanism in our architecture to account for the locality properties of many artifacts characteristic of synthetic images, such as their accumulation in the vicinity of the contours of the central object.

The approach consists of the following stages:

1. Image captions and embedding are extracted.

2. Object are detected in the image, grounded by image captions from the first stage.

3. A segmentation model uses available boxes to provide regions for objects in the image.

4. Regions for objects and background are created.

5. The regions are analysed in frequency domain.

6. Finally, the embeddings from the first and fifth stages are combined and fed into a classifier.

The stages are described in detail below.

3.1. Captioning Stage

During the first stage, we feed the image $I$ into the BLIP-2 model [14] to obtain its textual description, $caption_{blip}$, and image embedding, $e_{blip}$. The BLIP-2 model is designed to generate accurate textual descriptions of the main objects in an image. It produces the textual description by leveraging its internal representation and contextual understanding of the image content. In addition to the textual description, we extract the image embedding $e_{blip}$ from the image encoder of the BLIP-2 model. The image encoder embeds the image into a lower-dimensional feature representation that captures its global characteristics. This image embedding serves as a compact representation of the image and can be used as a global feature for further analysis.

$$caption_{blip}, e_{blip} = BLIP_2(I)$$

3.2. Object Detection Stage

In this stage, we use the Grounded DINO [16] model to perform zero-shot object detection for all the main objects in an input image $I$, utilizing the textual description $caption_{blip}$ obtained in the previous stage. The Grounded DINO model is specifically designed for this task by leveraging textual descriptions as prompts. It takes both the input image $I$ and the textual description $caption_{blip}$ and uses advanced deep learning architectures to produce bounding boxes for the main objects in the image. By incorporating the textual prompt, the model effectively learns to associate visual features with semantic descriptions.

To handle cases of overlapping bounding boxes and reduce the number of redundant detections, we employ the non-maximum suppression (NMS) technique. NMS selects the most confident bounding boxes while suppressing overlapping ones. This process ensures that only the most relevant and accurate bounding boxes are retained, thus improving the overall quality of the object detection results. As a result of this stage, we obtain a set of bounding boxes $boxes_{dino}$ that indicate the location of the main objects in the input image $I$.

$$boxes_{raw} = NMS(DINO(I, caption_{blip}))$$

3.3. Segmentation Stage

To obtain segmented masks of the main objects, denoted as $masks_{sam}$, in an image, we utilize the Segment Anything Model (SAM)[13]. SAM is a powerful model designed specifically to generate high-quality object masks based on various input prompts.

SAM processes the input bounding boxes $boxes_{dino}$ and the image $I$ to generate a set of masks $masks_{sam}$. These masks represent the segmented regions corresponding to the main objects in the image. Each mask accurately delineates the shape and boundaries of a specific object, enabling further analysis and classification tasks.

Thus, the first three stages aim to perform zero-shot preprocessing for improved image classification.

$$masks_{sam} = SAM(I, boxes_{dino})$$

3.4. Masking Stage

From the obtained masks $masks_{sam}$ for the image $I$, two subsets of images are formed: $OM$ and $WM$. The $OM$ subset is obtained by element-wise multiplication between the original image $I$ and each mask $masks_{sam}^i$ from $masks_{sam}$:

$$OM_i = I * masks_{sam}^i,$$

where $OM_i$ represents the $i$-th image from the $OM$ subset. The $WM$ subset is obtained by subtracting the corresponding elements of the $OM$ subset from the original image $I$:

$$WM_i = I - OM_i,$$

where $WM_i$ represents the $i$-th image from the $WM$ subset. These two subsets, $OM$ and $WM$, are created to facilitate separate analysis of the regions inside and outside the main objects in the image $I$.

3.5. Fourier Transform Stage

The Fourier Transform (FT) can be used to convert images into the frequency domain using the following formula:

$$F(u,v) = \sum_{x=0}^{N-1} \sum_{y=0}^{M-1} I(x,y) * e^{-i2\pi(\frac{ux}{N} - \frac{vy}{M})}$$

Here, $I$ represents an input image, $(x, y)$ represents the pixel's position on the input image, $N$ represents the input image's height, and $M$ represents its width. $F(u, v)$ represents the complex-valued frequency component at spatial frequency coordinates $(u, v)$.

We have developed two new image encoders based on the Fourier Transform for our new solution: the $OME$ and $WME$. These encoders consist of neural networks that use the Fourier transform as their underlying operation. The details are presented in 3.7.

The $OME$ takes each image from the $OM$ subset as input and produces a set of embeddings, denoted as $e_{OM}^i$, where $i$ ranges from 1 to the size of the $OM$ subset. To obtain a unified embedding representing images with segmented main objects on a black background, all $e_{OM}^i$ embeddings are averaged, resulting in a single vector $e_{OM}$. This process can be written according to the following formulas:

$$e_{OM}^i = OME(OM_i),$$

$$e_{OM} = \frac{1}{|OM|} * \sum_{i=1}^{|OM|} e_{OM}^i$$

Similarly, the $WME$ takes each image from the $WM$ subset as input. The encoder produces a set of embeddings, denoted as $e_{WM}^i$, where $i$ ranges from 1 to the size of the $WM$ subset. To obtain a unified embedding that represents the images with all the elements of the input image, except for the main objects replaced with a black background, we average all $e_{WM}^i$ embeddings. This results in a single vector $e_{WM}$. This process can be written using the following formulas:

$$e_{WM}^i = WME(WM_i),$$

$$e_{WM} = \frac{1}{|WM|} * \sum_{i=1}^{|WM|} e_{WM}^i$$

3.6. Final Stage

The final step in our new approach involves concatenating three embeddings: $e_{blip}$, $e_{OM}$, and $e_{WM}$, to create a unified feature vector $e_{uf}$ that describes all the characteristics of the images:

$$e_{uf} = Concatenate(e_{blip}, e_{OM}, e_{WM})$$

The unified feature vector $e_{uf}$ contains comprehensive information about the image, including the textual description from the BLIP-2 model, the segmented main objects on a black background from the $OME$, and the image without the main objects from the $WME$. By combining these embeddings, we create a rich representation that captures diverse aspects of the image, which can be used for further analysis and classification.

A visual representation of the approach can be seen in Figure 1.

3.7. Fourier Transform Encoders

The proposed encoders use fast Fourier convolution internally. The fast Fourier convolution (FFC) operator leverages the fundamental concepts of Fourier analysis to enable efficient non-local receptive fields and multi-scale feature fusion. By utilizing spectral analysis, FFC achieves global context capture and spatial information fusion through the following key ideas:

Spectral Decomposition: The Fourier transform decomposes a signal into its frequency components, enabling operations in the Fourier domain to affect the entire original signal globally. Inspired by this property, FFC uses Fourier transforms to allow non-local receptive fields.

Efficient Convolution in Fourier Domain: The spectral convolution theorem states that convolution in the spatial domain equals pointwise multiplication in the Fourier domain. By leveraging this theorem, FFC can perform convolutions with large spatial kernels more efficiently as pointwise multiplications on the Fourier spectrum. This leads to significant computational savings.

Fourier Units (FU): FFC introduces Fourier Units that apply FFT, modify the Fourier spectrum, and perform inverse FFT. These units enable efficient processing of large receptive fields by operating on the entire image.

Multi-scale Feature Fusion: To capture multi-scale information, FFC employs both local and global branches. The Local FU operates on patches to capture local features, while the Global FU uses the Fourier transform for non-local processing, capturing global context via spectral convolutions.

Cross-Scale Fusion: The local and global branches are combined to perform cross-scale fusion. This process involves separate local and global branches, and the outputs are then concatenated to obtain the final result. The local branch captures local features, while the global branch provides global context.

Mathematically, the FFC process can be described as follows. Given an input feature map $X$ of size $H \times W \times C$:

1. Split $X$ into local ($X_l$) and global ($X_g$) parts along the channel dimension.

2. Update the local branch $Y_{l \to l}$ through regular spatial convolution on $X_l$.

3. Update the global branch $Y_{g \to g}$ through Fourier transforms, pointwise convolutions on the Fourier spectrum, and inverse Fourier transforms on $X_g$.

4. Perform cross-scale fusion to combine the local and global branches.

5. Concatenate the outputs from both branches to obtain the final output $Y$.

In summary, FFC efficiently integrates spatial and spectral information by leveraging the principles of Fourier analysis. By utilizing spectral decomposition, efficient Fourier convolutions, and cross-scale fusion, FFC enables non-local receptive fields and multi-scale feature fusion in an efficient and unified manner, significantly benefiting various tasks in computer vision and signal processing.

4. Experiments

4.1. Datasets

The first dataset available for evaluating a proposed set of techniques was provided by the organizers of the recent AI or Not [1] competition. The full dataset consists of around 31,000 images, some of which were generated by AI. We used only the labelled training data. We split the data into a 3 to 1 ratio, resulting in 12,000 labeled images as the training set and 6,000 images as the test set.

The second dataset we used is a combination of the COCO2017 [15] dataset for real-world images and the Stable Diffusion Wordnet Dataset (SD-WD) [23, 2] for synthetic images. We obtained around 200,000 samples for the training set and about 40,000 images for the test set.

We also combined all the datasets above and used the resulting dataset as the third separate benchmark.

4.2. Baselines

As baselines, we used ResNet-50[11] and EfficientNet-b4 [24] in two variants, trained from scratch and pretrained on ImageNet [7].

As shown in [22], Contrastive Language-Image Pre-Training models perform well on synthetic data detection. In our experiments, we used CLIP ResNet-50, pretrained on the LAION dataset [6]. Embeddings from CLIP were also merged with embeddings from BLIP-2 [14] and used in the classifer.

4.3. Training Details

We trained each model for approximately 30 epochs using early stopping. Through experimentation, we determined that a batch size of 32 provided the best performance. To optimize training, we employed the AdamW [18] optimizer with a learning rate of 0.005. The CosineAnnealingLR [17] scheduler dynamically adjusted the learning rate throughout training.

To increase the diversity and robustness of our models, we applied various data augmentation techniques. These included HorizontalFlip, which flips input images horizontally; RGBShift, which randomly shifts the values of the red, green, and blue channels to introduce color variations;

| Model | Precision | Recall | F1-score | ROC AUC |
|---|---|---|---|---|
| AI or Not dataset | | | | |
| ResNet-50 (from scratch) | 0.833 | 0.843 | 0.838 | 0.895 |
| ResNet-50 (ImageNet) | 0.898 | 0.959 | 0.927 | 0.937 |
| EfficientNet-b4 (from scratch) | 0.754 | 0.784 | 0.769 | 0.711 |
| EfficientNet-b4 (ImageNet) | 0.891 | 0.915 | 0.903 | 0.958 |
| CLIP ResNet-50 (LAION) + BLIP-2 | 0.937 | 0.946 | 0.941 | 0.983 |
| Proposed approach | 0.990 | 0.993 | 0.991 | 0.998 |
| COCO 2017 + SD-WD combined dataset | | | | |
| ResNet50 (from scratch) | 0.828 | 0.841 | 0.834 | 0.885 |
| ResNet50 (ImageNet) | 0.962 | 0.973 | 0.967 | 0.975 |
| EfficientNet-b4 (from scratch) | 0.716 | 0.688 | 0.702 | 0.726 |
| EfficientNet-b4 (ImageNet) | 0.927 | 0.942 | 0.935 | 0.982 |
| CLIP ResNet-50 (LAION) + BLIP-2 | 0.972 | 0.985 | 0.978 | 0.988 |
| Proposed approach | 0.997 | 0.999 | 0.997 | 0.998 |
| AI or Not + COCO 2017 + SD-WD combined dataset | | | | |
| ResNet50 (from scratch) | 0.831 | 0.842 | 0.836 | 0.893 |
| ResNet50 (ImageNet) | 0.927 | 0.961 | 0.944 | 0.998 |
| EfficientNet-b4 (from scratch) | 0.741 | 0.699 | 0.719 | 0.725 |
| EfficientNet-b4 (ImageNet) | 0.931 | 0.952 | 0.941 | 0.999 |
| CLIP ResNet-50 (LAION) + BLIP-2 | 0.937 | 0.964 | 0.950 | 0.984 |
| Proposed approach | 0.995 | 0.999 | 0.996 | 0.998 |

Table 1. Results for baselines and a proposed approach.

| OME & WME | Concatenation(OME, WME) | Summation(OME, WME) |
|---|---|---|
| FFC-ResNet-158 & FFC-ResNet-158 | 0.998 | 0.956 |
| FFC-ResNet-158 & FFC-ResNet-101 | 0.986 | 0.943 |
| FFC-ResNet-158 & GFNet-B | 0.973 | 0.933 |
| FFC-ResNet-101 & GFNet-B | 0.972 | 0.921 |
| FFC-ResNet-101 & FFC-ResNet-101 | 0.971 | 0.920 |

Table 2. ROC-AUC metric on AI or Not dataset.

RandomBrightnessContrast, which randomly adjusts the brightness and contrast of the images; Mixup [29], which combines pairs of training examples by linearly interpolating their features and labels; and Cutmix [28], which replaces a portion of one image with a portion from another image to encourage the model to learn from different parts of the input space. These augmentations aimed to improve diversity and generalization.

We trained our models using a cluster with multiple NVIDIA T4 16GB GPU workers.

4.4. Ablation Study

For the ablation study, we focused on experiments to find the best combination of OME and WME features. The results are reported in Table 2. The concatenation of the FFC-ResNet-128 architecture for OME and WME that achieved the highest efficiency was used in the final version of the proposed architecture. It is worth noting that the GFNet architecture [20] did not achieve the same high results as when FFC is used.

We also experimented with using the Fourier transform as a preprocessing step [30] for images before they are fed into OME or WME. However, these experiments did not yield satisfactory results. We believe this means that incorporating the Fourier transform within the encoder architecture is more effective than using the Fourier transform as image preprocessing in combination with classical computer vision models based on CNNs.

5. Results & Conclusion

In this paper, we presented the approach for constructing and training deep neural networks to recognize synthetic images. Our proposed techniques have enabled us to develop a solution that outperforms counterparts based on widely-spread approaches to image recognition for fraudulent images on several datasets. The proposed approach combines common image features obtained using multimodal encoders, specially designed Fourier encoders, segmentation of the central objects in the scene, and an attention mechanism. In addition to competitive metrics (see Table 1), the architecture has an intuitive design and value in terms of scientific novelty. We also provide detailed information about the design, operation principles, data preparation, and processing using the proposed architecture.

6. Future Work

It is important to note that, although our architecture shows promising results, many of its components have a significant number of parameters, require long training times, and have high inference costs. These characteristics are particularly important for deploying models in production, especially in the field of cybersecurity where large amounts of data are processed. Therefore, further work should focus on optimizing the listed characteristics of the system and its components.

References

[1] https://huggingface.co/spaces/competitions/aiornot.

[2] https://www.kaggle.com/datasets/astoeckl/stable-diffusion-wordnet-dataset.

[3] Andrew Brock, Jeff Donahue, and Karen Simonyan. Large scale gan training for high fidelity natural image synthesis. *arXiv preprint arXiv:1809.11096*, 2018.

[4] Riccardo Corvi, Davide Cozzolino, Giada Zingarini, Giovanni Poggi, Koki Nagano, and Luisa Verdoliva. On the detection of synthetic images generated by diffusion models, 11 2022.

[5] Riccardo Corvi, Davide Cozzolino, Giada Zingarini, Giovanni Poggi, Koki Nagano, and Luisa Verdoliva. On the detection of synthetic images generated by diffusion models. In *ICASSP 2023-2023 IEEE International Conference on Acoustics, Speech and Signal Processing (ICASSP)*, pages 1–5. IEEE, 2023.

[6] Yufeng Cui, Lichen Zhao, Feng Liang, Yangguang Li, and Jing Shao. Democratizing contrastive language-image pre-training: A clip benchmark of data, model, and supervision, 2022.

[7] Jia Deng, Wei Dong, Richard Socher, Li-Jia Li, Kai Li, and Li Fei-Fei. Imagenet: A large-scale hierarchical image database. In *2009 IEEE Conference on Computer Vision and Pattern Recognition*, pages 248–255, 2009.

[8] Joel Frank, Thorsten Eisenhofer, Lea Schönherr, Asja Fischer, Dorothea Kolossa, and Thorsten Holz. Leveraging frequency analysis for deep fake image recognition. In *International conference on machine learning*, pages 3247–3258. PMLR, 2020.

[9] Sharath Girish, Saksham Suri, Sai Saketh Rambhatla, and Abhinav Shrivastava. Towards discovery and attribution of open-world gan generated images. In *Proceedings of the IEEE/CVF International Conference on Computer Vision*, pages 14094–14103, 2021.

[10] Ian Goodfellow, Jean Pouget-Abadie, Mehdi Mirza, Bing Xu, David Warde-Farley, Sherjil Ozair, Aaron Courville, and Yoshua Bengio. Generative adversarial networks. *Communications of the ACM*, 63(11):139–144, 2020.

[11] Kaiming He, Xiangyu Zhang, Shaoqing Ren, and Jian Sun. Deep residual learning for image recognition. In *2016 IEEE Conference on Computer Vision and Pattern Recognition (CVPR)*, pages 770–778, 2016.

[12] Ricker Jonas, Simon Damm, Thorsten Holz, and Asja Fischer. Towards the detection of diffusion model deepfakes, 10 2022.

[13] Alexander Kirillov, Eric Mintun, Nikhila Ravi, Hanzi Mao, Chloe Rolland, Laura Gustafson, Tete Xiao, Spencer Whitehead, Alexander C. Berg, Wan-Yen Lo, Piotr Dollár, and Ross Girshick. Segment anything, 2023.

[14] Junnan Li, Dongxu Li, Silvio Savarese, and Steven Hoi. Blip-2: Bootstrapping language-image pre-training with frozen image encoders and large language models, 2023.

[15] Tsung-Yi Lin, Michael Maire, Serge J. Belongie, James Hays, Pietro Perona, Deva Ramanan, Piotr Dollár, and C. Lawrence Zitnick. Microsoft COCO: common objects in context. In David J. Fleet, Tomás Pajdla, Bernt Schiele, and Tinne Tuytelaars, editors, *Computer Vision - ECCV 2014 - 13th European Conference, Zurich, Switzerland, September 6-12, 2014, Proceedings, Part V*, volume 8693 of *Lecture Notes in Computer Science*, pages 740–755. Springer, 2014.

[16] Shilong Liu, Zhaoyang Zeng, Tianhe Ren, Feng Li, Hao Zhang, Jie Yang, Chunyuan Li, Jianwei Yang, Hang Su, Jun Zhu, and Lei Zhang. Grounding dino: Marrying dino with grounded pre-training for open-set object detection, 2023.

[17] Ilya Loshchilov and Frank Hutter. Sgdr: Stochastic gradient descent with warm restarts. *arXiv preprint arXiv:1608.03983*, 2016.

[18] Ilya Loshchilov and Frank Hutter. Decoupled weight decay regularization. *arXiv preprint arXiv:1711.05101*, 2017.

[19] Aditya Ramesh, Mikhail Pavlov, Gabriel Goh, Scott Gray, Chelsea Voss, Alec Radford, Mark Chen, and Ilya Sutskever. Zero-shot text-to-image generation. In *International Conference on Machine Learning*, pages 8821–8831. PMLR, 2021.

[20] Yongming Rao, Wenliang Zhao, Zheng Zhu, Jiwen Lu, and Jie Zhou. Global filter networks for image classification. *Advances in neural information processing systems*, 34:980–993, 2021.

[21] Robin Rombach, Andreas Blattmann, Dominik Lorenz, Patrick Esser, and Björn Ommer. High-resolution image synthesis with latent diffusion models. In *Proceedings of the IEEE/CVF Conference on Computer Vision and Pattern Recognition*, pages 10684–10695, 2022.

[22] Zeyang Sha, Zheng Li, Ning Yu, and Yang Zhang. Defake: Detection and attribution of fake images generated by text-to-image diffusion models. *arXiv preprint arXiv:2210.06998*, 2022.

[23] Andreas Stöckl. Evaluating a synthetic image dataset generated with stable diffusion. *arXiv preprint arXiv:2211.01777*, 2022.

[24] Mingxing Tan and Quoc Le. Efficientnet: Rethinking model scaling for convolutional neural networks. In *International conference on machine learning*, pages 6105–6114. PMLR, 2019.

[25] Sheng-Yu Wang, Oliver Wang, Richard Zhang, Andrew Owens, and Alexei A Efros. Cnn-generated images are surprisingly easy to spot... for now. In *Proceedings of the IEEE/CVF conference on computer vision and pattern recognition*, pages 8695–8704, 2020.

[26] Ling Yang, Zhilong Zhang, Yang Song, Shenda Hong, Runsheng Xu, Yue Zhao, Yingxia Shao, Wentao Zhang, Bin Cui, and Ming-Hsuan Yang. Diffusion models: A comprehensive survey of methods and applications, 2022.

[27] Ning Yu, Larry S Davis, and Mario Fritz. Attributing fake images to gans: Learning and analyzing gan fingerprints. In *Proceedings of the IEEE/CVF international conference on computer vision*, pages 7556–7566, 2019.

[28] S. Yun, D. Han, S. Chun, S. Oh, Y. Yoo, and J. Choe. Cutmix: Regularization strategy to train strong classifiers with localizable features. In *2019 IEEE/CVF International Conference on Computer Vision (ICCV)*, pages 6022–6031, Los Alamitos, CA, USA, nov 2019. IEEE Computer Society.

[29] Hongyi Zhang, Moustapha Cisse, Yann Dauphin, and David Lopez-Paz. mixup: Beyond empirical risk minimization. 10 2017.

[30] Xu Zhang, Svebor Karaman, and Shih-Fu Chang. Detecting and simulating artifacts in gan fake images (extended version).

[31] Sm Zobaed, Md Fazle Rabby, Md Hossain, Ekram Hossain, Md Sazib Hasan, Asif Karim, and Khan Hasib. *DeepFakes: Detecting Forged and Synthetic Media Content Using Machine Learning*, pages 177–201. 09 2021.

The invention claimed is:

1. A method for detecting synthetic visual media, the method comprising the steps of:
   receiving visual media, wherein the visual media is synthetic visual media or genuine visual media;
   identifying at least one feature within the visual media;
   identifying a first portion of the visual media and second portion of the visual media, the first portion of the visual media containing the at least one feature and the second portion of the visual media not including the at least one feature;
   generating embeddings for the first portion of the visual media and the second portion of the visual media, wherein the step of generating embeddings further comprises the step of converting the first portion of the visual media and the second portion of the visual media into the frequency domain;
   providing the first portion and the second portion to a trained machine learning (ML) model; and
   the trained ML model providing data indicating the visual media to be synthetic and/or genuine.

2. The method of claim 1, wherein the visual media is an image or a video.

3. The method of claim 1 or claim 2, wherein the data indicating the visual media to be synthetic and/or genuine comprises a probability value.

4. The method of claim 1 further comprising the steps of:
   comparing the data indicating the visual media to be synthetic and/or genuine to a threshold;
   when the data is above the threshold then providing an output stating that the visual media was synthetically generated; and
   when the indication is below the threshold then providing an output stating that the visual media is genuine.

5. The method of claim 1 further comprising the step of:
   extracting the visual media from an application comprising an identity verification request;
   when the provided data indicates the visual media is synthetic, flagging the visual media as anomalous and/or flagging the application as anomalous.

6. The method of claim 1, wherein the step of converting the first portion of the visual media and the second portion of the visual media into the frequency domain uses Fast Fourier Convolution, the method further comprising the step of combining the embeddings before they are provided to the trained ML model, wherein the embeddings are combined by concatenation.

7. The method of claim 1 wherein the ML model is a combination of at least one or more ML models comprising:
   at least one encoder model mapping the first and the second portions to corresponding embeddings; and
   a classifier model mapping the first portion embedding and the second portion embedding to an indication that the visual media is synthetic.

8. The method of claim 7 further comprising at least two encoder models, wherein:
   at least one encoder model is configured to map the first portion to the first portion embedding; and
   at least one encoder model is configured to map the second portion to the second portion embedding, wherein the at least one encoder model is a ML model configured to generate embeddings in the frequency domain.

9. The method of claim 8, wherein the at least one encoder model is a Fast Fourier Convolution Network.

10. The method of claim 1 further comprising the step of providing one or more descriptor of the visual media to a trained ML classifier of the ML model, wherein the one or more descriptor is an output of a second trained ML model.

11. The method of claim 10 further comprising the step of combining the visual media descriptor with the first and the second portion embeddings, wherein the visual media descriptor and the first and the second portion embeddings are combined by concatenation.

12. The method of claim 1 further comprising the steps of:
   before the trained ML model provides data indicating the visual media to be synthetic and/or genuine identifying one or more additional features in the visual media;
   for each of the one or more additional features:
   identifying a first portion of the visual media and second portion of the visual media, the first portion of the visual media containing the one or more additional features and the second portion of the visual media not including the one or more additional features; and
   providing the first portion and the second portion to the trained ML model.

13. The method of claim 12 further comprising selecting a subset of the identified features to be separated into the first portion and the second portion.

14. The method of claim 1, wherein the first portion is a foreground of the visual media and second portion of the visual media is a background of the visual media, and wherein the first portion corresponds to one or more subject features of the visual media and second portion of the visual media corresponds to the features other than the subject features of the visual media.

15. A method for training a machine learning (ML) model to detect synthetic visual media, the method comprising the steps of:
   providing a plurality of genuine visual media;
   providing a plurality of synthetic visual media;
   for each visual media in the plurality of synthetic visual media and genuine visual media:
   identifying at least one feature within the visual media;
   identifying a first portion of the visual media and second portion of the visual media, the first portion of the visual media containing the at least one feature and the second portion of the visual media not including the at least one feature;
   providing to an ML model the first and second portions of the visual media;
   obtaining data from the ML model indicating that the visual media is a synthetic and/or that the visual media is genuine; and
   based on the data obtained from the ML model and data stating that the visual media is synthetic or genuine, updating the ML model,
   wherein for each visual media in the plurality of synthetic visual media and genuine visual media before being provided to the ML model transforming the first portion and the second portion of the visual media into the frequency domain to form embeddings.

16. The method of claim 15, wherein the data obtained from the ML model indicating the visual media to be synthetic and/or genuine comprises a probability value,
   wherein the ML model is a combination of at least one or more ML models comprising:
   at least one encoder model mapping the first and second portions to corresponding embeddings; and
   a classifier model mapping the first portion embedding and the second portion embedding to an indication on if the visual media is synthetic.

17. The method of claim 16, wherein each of the one or more ML models may be updated based on the data obtained from the ML model and data stating that the visual media is synthetic or genuine.

18. The method of claim 15, wherein for each visual media in the plurality of synthetic visual media and genuine visual media one or more descriptor of the visual media from a trained ML classifier is provided to the ML model.

19. A non-transitory computer-readable medium storing instructions that, when read by an apparatus, cause the apparatus to:
- on receipt of visual media, wherein the visual media is synthetic visual media or genuine visual media;
- identifying at least one feature within the visual media;
- identifying a first portion of the visual media and second portion of the visual media, the first portion of the visual media containing the at least one feature and the second portion of the visual media not including the at least one feature;
- generating embeddings for the first portion of the visual media and the second portion of the visual media, wherein the step of generating embeddings further comprises the step of converting the first portion of the visual media and the second portion of the visual media into the frequency domain;
- providing the first portion and the second portion to a trained machine learning (ML) model; and
- the trained ML model providing data indicating the visual media to be synthetic and/or genuine.

\* \* \* \* \*